United States Patent [19]

McCan et al.

[11] Patent Number: 4,579,084
[45] Date of Patent: Apr. 1, 1986

[54] NECKBAR FOR AN ANIMAL HEADGATE

[75] Inventors: Duane A. McCan; Carl L. Smith, both of Lexington, Nebr.

[73] Assignee: Valley Sales Co., Lexington, Nebr.

[21] Appl. No.: 728,365

[22] Filed: Apr. 29, 1985

[51] Int. Cl.$^4$ .............................................. A01K 1/062
[52] U.S. Cl. .................................... 119/98; 119/147 R
[58] Field of Search ........................ 119/98, 99, 147 R

[56] References Cited

U.S. PATENT DOCUMENTS

| | | | |
|---|---|---|---|
| 2,113,741 | 4/1938 | Peterson | 119/99 |
| 3,051,127 | 8/1962 | Norbury | 119/99 |
| 3,691,998 | 9/1972 | Luirstra | 119/98 |
| 3,814,060 | 6/1974 | Swenson | 119/98 |

Primary Examiner—Hugh R. Chamblee
Attorney, Agent, or Firm—Henderson & Sturm

[57] ABSTRACT

An animal headgate including a pair of neckbars attached to the gates in such a manner that the neckbars are movable and adjustable independently from the movement of or adjustment of the gates. The neckbars are biased to pivot away from each other. Contact of the neckbar lever with a locking mechanism acts to overcome the biasing force and positions and locks the neckbars in a predetermined desired spaced relationship when the headgate is in the latch position. When the locking mechanism is released, the neckbars immediately release from the animal's neck while the shoulder bars gradually release from the animal's shoulders as the gates open.

9 Claims, 13 Drawing Figures

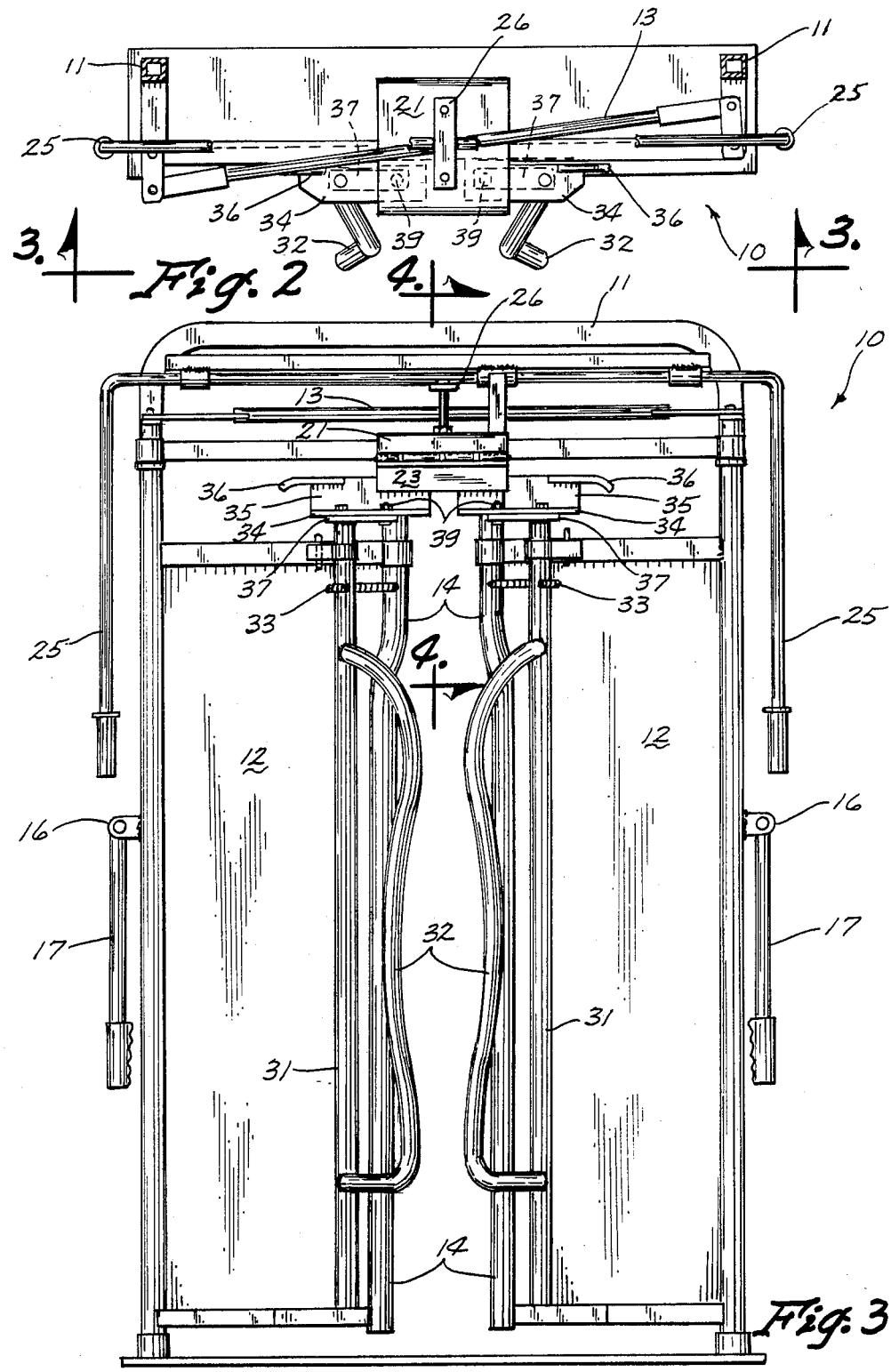

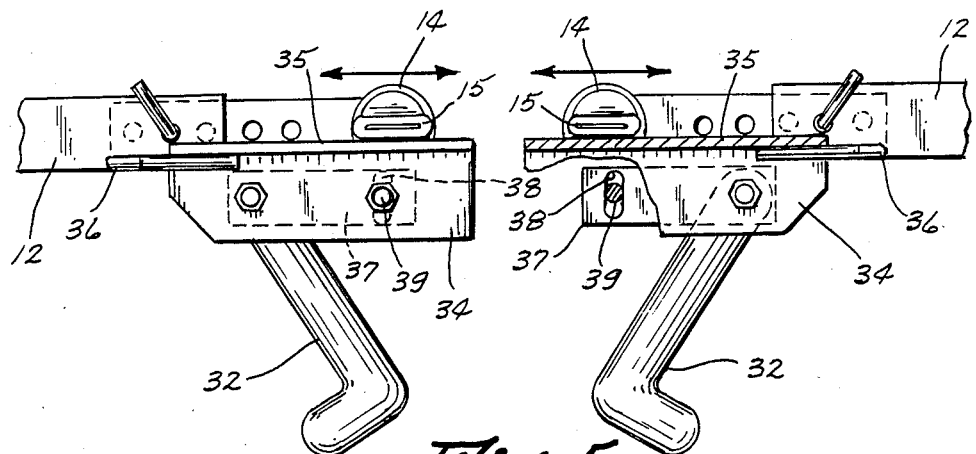
Fig. 5
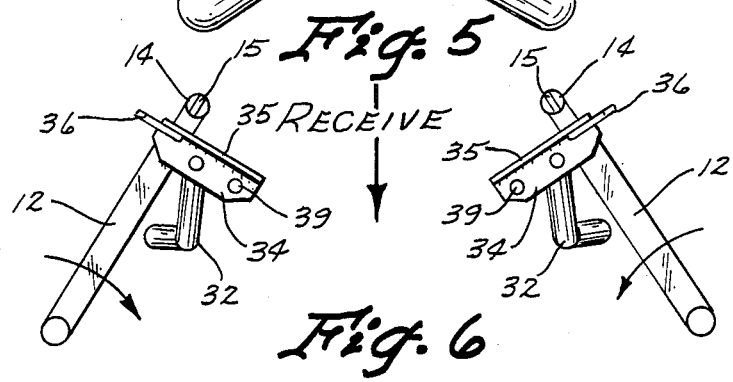
Fig. 6
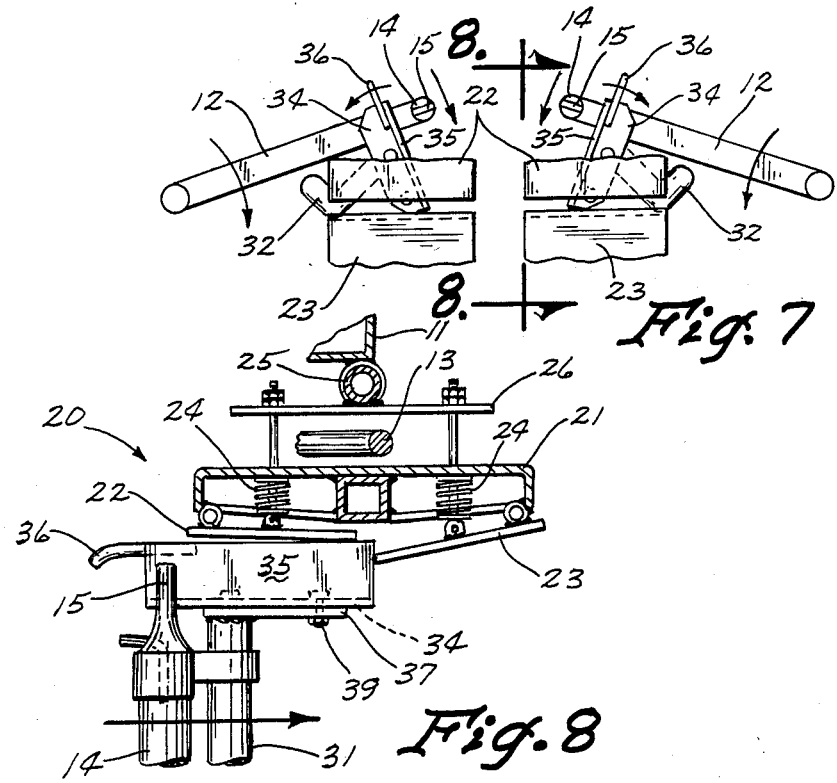
Fig. 7
Fig. 8

NECKBAR FOR AN ANIMAL HEADGATE

TECHNICAL FIELD

This invention relates generally to headgates used in animal husbandry and more particularly to an improved neckbar for an animal headgate.

BACKGROUND ART

Animal husbandry involves the control and management of animals, particularly domestic animals. It is sometimes necessary to physically restrain an animal while it is being attended to. One may wish to control an animal for a variety of purposes such as inspection of the animal, tagging or tattooing the animal for identification, veterinarian aid such as hypodermic injections, and cleaning the animal.

Some animals are small in stature and may be adequately controlled simply by being physically held by an attendant. Larger animals, however, such as cattle must be controlled by other means. It is particularly important that the animal be restrained in such a manner as to effectively accomplish the task for which he is being controlled.

To accomplish such a task, there exists a variety of animal headgates that control an animal's movement by restraining the animal's head region. Headgates generally have three operating positions. The receiving position provides an open headgate, positioned to allow tha animal to enter the apparatus. Once in the headgate, the gates are closed around the animal's head region in a latch position to restrain the animal within the headgate. The release position is similar to the receiving position in that the gates are in an open position; the animal is free to exit the apparatus when the headgates are in the release position.

Prior art headgates do not always satisfactorily restrain an animal for all purposes. The major problem with such a headgate is that it allows the animal too much freedom of movement. This is because the animal is restrained by a single securement unit such as a set of bars enclosed near the animal's head, one on each side. As there is only a single securement unit, the animal is often able to move about freely, particularly in the head/neck region, which is forward of the securement unit. With such freedom of movement, the purpose of the headgate is often defeated.

Allowing the animal too much movement while the headgate is in the latch mode may result in unwanted consequences. The animal may be able to avoid the intended attention, thereby thwarting the purpose of the apparatus. In addition, an animal may injure itself if it becomes irritated and is not properly restrained. Inadequate restraint may even result in injury to those near an animal whose movement becomes wild and uncontrollable.

These problems are substantially resolved by the provision of the invention disclosed in U.S. Pat. No. 4,517,924. That invention generally provides an animal headgate having a forward portion and a rearward portion on a stationary frame. An animal such as a domestic cow enters the apparatus from the rearward direction. Within the apparatus the cow is restrained by a pair of headgates each having a pair of shoulder bars and a pair of vertically disposed neckbars. While being restrained within the apparatus the animal may be effectively attended to for a variety of reasons including tagging and veterinarian aid. The apparatus includes a locking unit for selectively locking the headgates during the latch position, thereby preventing the animal from exiting the apparatus. When the desired task is completed, the locking unit is disengaged and the animal is allowed to exit the apparatus through the forward portion.

Presently, neckbars are directly connected to the gates by a complex linkage that results in a slow separation of the neckbars as the animal exits. Also, these neckbars are adjustable only in relation to the adjustment of the spacing between the shoulder bars which prevents fine adjustment required for the aniaml neck width and wear.

Those concerned with these and other problems recognize the need for an improved neckbar for an animal headgate.

DISCLOSURE OF THE INVENTION

The present invention provides an animal headgate including a pair of neckbars attached to the gates in such a manner that the neckbars are movable and adjustable independently from the movement of or adjustment of the gates. The neckbars are biased to pivot away from each other. Contact of the neckbar lever with a locking mechanism acts to overcome the biasing force and positions and locks the neckbars in a predetermined desired spaced relationship when the headgate is in the latch position. When the locking mechanism is released, the neckbars immediately release from the animal's neck while the shoulder bars gradually release from the animal's shoulders as the gates open.

The neckbars are further provided with an adjustment plate that allows for the fine adjustment of the spacing between the neckbars, and a trip finger is provided on the neckbar lever to allow the movement of the gates from the release position back to the receive position while by-passing the latch position.

An object of the present invention is the provision of an improved neckbar for an animal headgate.

Another object is to provide a neckbar for an animal headgate that is movable independently from the gates.

A further object of the invention is the provision of a neckbar that can be adjusted independently from the gates.

Still another object is to provide a neckbar for an animal headgate that rapidly releases from the animal's neck when the locking mechanism is released.

A still further object of the present invention is the provision of an animal headgate that is easily operated and maintained.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 2 is a top plan sectional view taken along line 2—2 of FIG. 1;

FIG. 3 is a front elevation view thereof;

FIG. 5 is a top plan sectional view taken along line 5—5 of FIG. 4 having portion cut away to show the friction bolt and slot arrangement that allows for fine adjustment of the spacing between the opposing neckbars;

FIG. 6 is a top plan schematic view illustrating the relative position of the spring biased neckbars in relation to their respective gates when the headgate is in the receive position;

FIG. 7 is a top plan schematic view similar to FIG. 6 and illustrating the headgate moving from the receive position to the latch positon;

FIG. 8 is an enlarged side elevation sectional view taken along line 8—8 of FIG. 7 showing the front edge of the neckbar lever as it initially contacts the free edge of the forward latch plate;

BEST MODE FOR CARRYING OUT THE INVENTION

Figure 1:
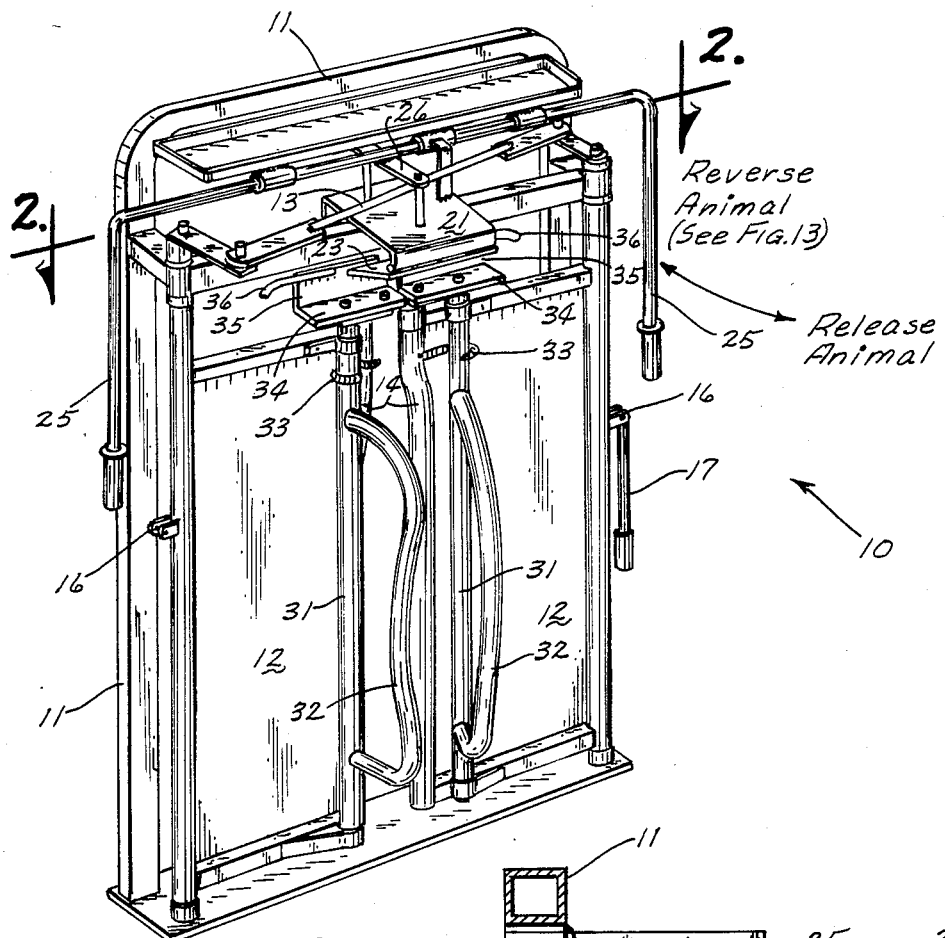
FIG. 1 is a perspective view of an animal headgate utilizing the neckbar of the present invention and illustrating the headgate in the latch position.

Referring now to the drawings, wherein like reference numerals designate identical or corresponding parts throughout the several views, FIG. 1 shows a headgate depicted generally by the reference numeral 10. The headgate (10) includes a generally stationary frame (11) that pivotally supports a pair of gates (12) interconnected by a tie rod (13) that effects simultaneous movement of both gates (12). Each gate (12) includes a shoulder bar (14) having a flattened upper portion (15). Also, each gate (12) includes a clevis (16) that is disposed to receive a handle (17) for manual operation of the gates (12).

Figure 4:
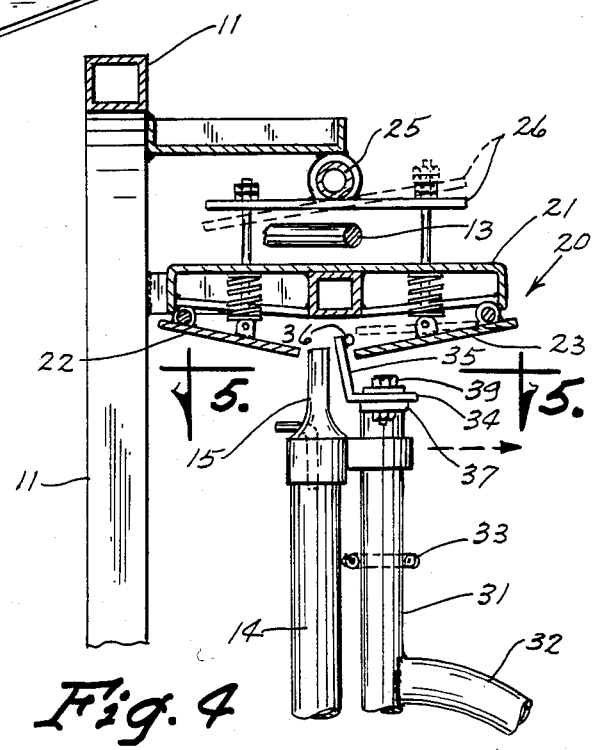
FIG. 4 is an enlarged side elevation sectioned view taken along line 4—4 of FIG. 3 showing the headgate in the latched position and illustrating in dashed lines the upward movement of the forward latch plate in response to the forward arcing movement of the latch operator handle to release the animal in the forward direction.
Figure 9:
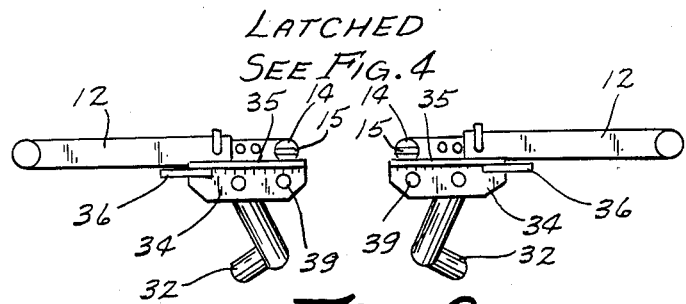
FIG. 9 is a top plan schematic view similar to FIG. 8 but showing the headgate in the latched position where the neckbar levers are pivoted into alignment with their respective gates and the upper flange of the neckbar lever is received in the space between the free edges of the forward latch plate and the rear latch plate.

Referring now to FIGS. 1 and 4, the frame (11) also supports a locking mechanism generally designated by the numeral 20. The locking mechanism (20) includes a support bracket (21) which pivotally supports a rear latch plate (22) and a forward latch plate (23). The latch plates (22 and 23) are biased downwardly by the springs (24) and are interconnected to a latch operator handle (25) by rocker arm (26). The free edges of the latch plates (22 and 23) are spaced apart to form an open cavity that is disposed to receive the upper portion (15) of the shoulder bar (14).

As most clearly shown by FIGS. 1, 4 and 5, each gate (12) pivotally supports a neckbar pivot member (31). Each neckbar pivot member (31) carries a generally vertically disposed forwardly extending neckbar (32). A spring (33) interconnects the gate (12) and the neckbar pivot member (31) and biases the neckbar (32) in toward the gate (12). The upper portions of the neckbar pivot member (31) carries a neckbar lever (34) having an upwardly and rearwardly directed upper flange (35) which is disposed to be received within the open cavity of the latch mechanism (20) when the headgate (10) is in the latch position. The rear edge of the upper flange (35) carries an outwardly and downwardly directed trip finger (36). An adjustment plate (37) is disposed intermediate the neckbar pivot member (31) and the neckbar lever (34) and includes an arcuate slot (38). The slot (38) is registered with an opening in the neckbar lever (34) and a friction bolt (39) secures the plate (37) such that the spacing between the neckbars (31) can be secured in the desired position.

In operation, the animal is directed to the headgate (10) when the apparatus is in the receive position illustrated in FIG. 6. As the animal moves forward as indicated by the directional arrow, the animal's shoulders contact the shoulder bars (14) and moves the gates (12) to the position shown in FIGS. 7 and 8 where the forward edge of the headgate lever (34) contacts the free edge of the forward latch plate (23). As the animal continues to move forward, the headgate (10) is moved to the latch position illustrated in FIGS. 1 through 5 and 9 where the neckbar levers (34) are forced to a position transverse to the direction of travel and both the upper portion (15) of the shoulder bar (14) and the neckbar lever flange (35) are received in the open cavity of the locking mechanism (20).

Figure 10:
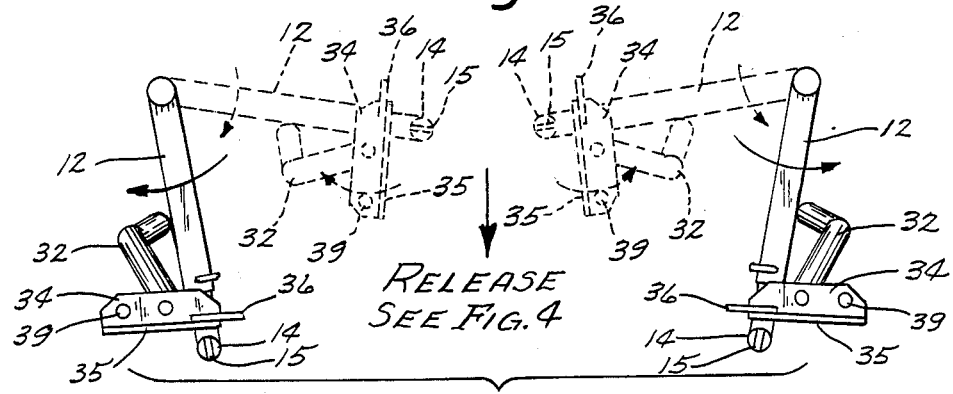
FIG. 10 is a top plan schematic view similar to FIG. 9 but showing the headgate moving from the latched to the forward release position and illustrating in dashed lines the immediate pivoting of the spring biased neckbars away from each other when the forward latch plate is moved upwardly.

When the animal is to be released, the operator handle (25) is moved forward as indicated in FIG. 1 and the neckbars (32) are immediately released from the animal's neck as shown in the dashed line representation in FIG. 10. The animal then moves forward and forces the gates (12) to the release position shown in full lines in FIG. 10.

Figure 11:
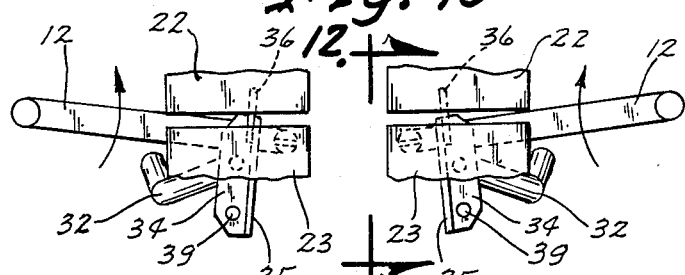
FIG. 11 is a top plan schematic view similar to FIG. 10 but showing the headgate moving from the forward release position back toward the receive position.
Figures 12, 13:
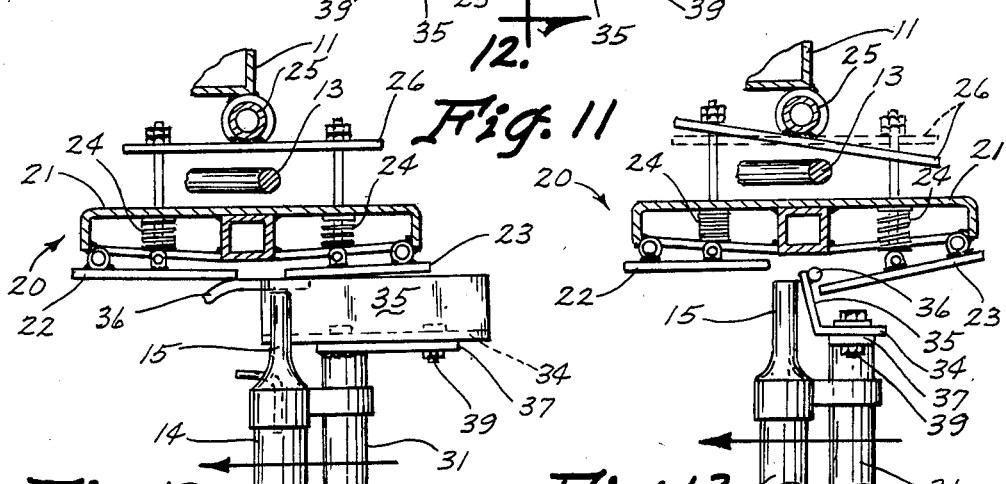
FIG. 12 is an enlarged side elevation sectional view taken along line 12—12 of FIG. 11 showing the trip finger on the rear edge of the neckbar lever as it contacts and elevates the forward latch plate and rear latch plate to by-pass the latched position.
FIG. 13 is an enlarged side elevation sectional view similar to FIG. 4 but illustrating the movement of the headgate from the latched position to the receive position as when it is desired to reverse the animal from the headgate.

To reset the headgate (10) to the receive position, the gate handle (17) is horizontally positioned and force is applied in the forward direction. As the gates (12) move toward the rear, the trip fingers (36) contact the latch plates (23 and 22), as illustrated in FIGS. 11 and 12, and deflect them upwardly so that the latch position is by-passed. When returned to the receive position, the operation is repeated with the next animal.

When it is necessary to reverse an animal from the latch position, the operator handle (25) is moved to the rear as shown in FIG. 1 and the rear latch plate (22) is elevated (FIG. 13), thus allowing the gates (12) to open to the rear.

Referring now to FIG. 5, the spacing between adjacent neckbars (32) can only be finely adjusted by loosening the friction bolts (39), rotating the adjustment bars (37) to the desired positions, and retightening the bolts (39). Spacing of the neckbars (32) can thus be adjusted independently of the shoulder bars (14).

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. In an animal headgate having a stationary frame, first and second gate pivot members pivotally connected to said stationary frame, first and second gates attached to said gate pivot members, said gates being movable among receive, latch and release positions, first animal securement bars attached to said gates for substantially restraining movement of an animal, means for selectively locking said gates in the latch position, and second animal securement bars operably affixed to said gates for further restraining movement of said animal, wherein said second animal securement bar is positioned forward of said first animal securement bar thereby creating a restrained and exposed area on a restrained animal between said first and second animal securement bars, an improvement comprising:

means for biasing said second animal securement bars toward said gate pivot members; and means for selectively locking said second animal securement bars against movement when said gates are in the latch position.

2. The improvement of claim 1 wherein said second animal securement bars are pivotally attached to said gates and wherein said biasing means inlcudes a compression spring disposed to interconnect said gates and said second animal securement bars.

3. The improvement of claim 2 wherein said second animal securement bars includes a pair of neckbars each including a neckbar pivot member pivotally attached to said gates.

4. The improvement of claim 3 wherein said second securement bar locking means includes a neckbar lever attached to said neckbar pivot member, said neckbar lever including an upwardly directed flange disposed to engage said gate locking means as said gates move among the receive, latch and release position.

5. The improvement of claim 4 wherein said flange is upwardly and rearwardly directed.

6. The improvement of claim 4 further including a horizontally disposed trip finger attached to the rear of said neckbar lever and disposed to engage said gate locking means as said gates move from the release position back toward the receive position whereby the latch position is by-passed.

7. The improvement of claim 6 wherein said gate locking means includes a downwardly biased forwardly and downwardly directed rear latch plate and a downwardly biased rearwardly and downwardly directed front latch plate disposed in spaced relationship such that an open cavity is formed therebetween, and wherein the neckbar lever flange is disposed within the open cavity when said gates are in the latch position whereby the neckbars are simultaneously and independently locked in a preselected position.

8. The improvement of claim 4 further including means for selectively adjusting said neckbar pivot member and said neckbar lever with respect to each other whereby the spacing between adjacent neckbars can be selectively adjusted.

9. The improvement of claim 8 wherein said adjusting means includes an adjustment plate pivotally attached to and disposed intermediate said neckbar pivot member and said neckbar lever, said adjustment plate including an arcuate slot disposed to register with an opening in said neckbar lever, and a friction belt disposed to simultaneously engage said opening and a portion of said slot to secure the neckbar pivot member in the desired adjusted position.

* * * * *